(12) United States Patent  (10) Patent No.: US 8,793,363 B2
Sater et al.  (45) Date of Patent: Jul. 29, 2014

(54) SYSTEMS AND METHODS FOR REAL-TIME SERVICE ASSURANCE

(75) Inventors: Melanie Sater, Atlanta, GA (US); Ginger Chien, Bellevue, WA (US); Dan Druta, Issaquah, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1282 days.

(21) Appl. No.: 12/190,369

(22) Filed: Aug. 12, 2008

(65) Prior Publication Data

US 2009/0181665 A1   Jul. 16, 2009

Related U.S. Application Data

(60) Provisional application No. 61/021,295, filed on Jan. 15, 2008.

(51) Int. Cl.
*G06F 15/173* (2006.01)

(52) U.S. Cl.
USPC ............ 709/224; 709/223; 709/225; 709/226

(58) Field of Classification Search
None
See application file for complete search history.

(56) References Cited

U.S. PATENT DOCUMENTS

| | | | | |
|---|---|---|---|---|
| 5,633,999 | A * | 5/1997 | Clowes et al. | 714/6.21 |
| 6,934,248 | B1 * | 8/2005 | DeBoer et al. | 370/217 |
| 7,111,205 | B1 * | 9/2006 | Jahn et al. | 714/47.2 |
| 7,146,347 | B1 * | 12/2006 | Vazquez et al. | 706/12 |
| 7,467,198 | B2 * | 12/2008 | Goodman et al. | 709/223 |
| 7,818,631 | B1 * | 10/2010 | Halikhedkar et al. | 714/48 |
| 7,835,720 | B2 * | 11/2010 | Pousti | 455/406 |
| 7,987,228 | B2 * | 7/2011 | McKeown et al. | 709/202 |
| 8,090,699 | B2 * | 1/2012 | Pousti et al. | 707/705 |
| 8,346,931 | B2 * | 1/2013 | Bobak et al. | 709/226 |
| 8,365,185 | B2 * | 1/2013 | Bobak et al. | 718/106 |
| 8,375,244 | B2 * | 2/2013 | Bobak et al. | 714/3 |
| 8,447,859 | B2 * | 5/2013 | Bobak et al. | 709/226 |
| 2004/0039968 | A1 * | 2/2004 | Hatonen et al. | 714/39 |
| 2004/0261116 | A1 * | 12/2004 | Mckeown et al. | 725/109 |
| 2005/0065805 | A1 * | 3/2005 | Moharram | 705/1 |
| 2007/0097857 | A1 * | 5/2007 | Zhai | 370/218 |
| 2007/0106768 | A1 * | 5/2007 | Frietsch et al. | 709/223 |
| 2007/0266034 | A1 * | 11/2007 | Pousti et al. | 707/10 |
| 2009/0172674 | A1 * | 7/2009 | Bobak et al. | 718/101 |
| 2009/0181665 | A1 * | 7/2009 | Sater et al. | 455/424 |

* cited by examiner

*Primary Examiner* — Backhean Tiv
(74) *Attorney, Agent, or Firm* — Amin, Turocy & Watson, LLP

(57) ABSTRACT

A system and methods for providing service assurance using real-time monitoring, management and maintenance capabilities to provide customers and vendors with information related to the state of the service. The service assurance domain implements end-to-end functionality with a level of granularity sufficient to diagnose issues to the device and call/session level.

33 Claims, 12 Drawing Sheets

SYSTEMS AND METHODS FOR REAL-TIME SERVICE ASSURANCE

TECHNICAL FIELD

The subject invention relates generally to the telecommunications industry, and more particularly to the management of a mobile telephone system with respect to the service assurance domain with regards to availability, performance and root cause analysis.

BACKGROUND

The mobile telephone industry has been associated with tremendous growth over the last several years. Today's mobile devices (e.g., mobile phones, personal digital assistants (PDAs), etc.) can be utilized as full-service computing mechanisms. For example, many of the most recent and advanced mobile devices can be associated with word processing software, web browsing software, electronic mail software, accounting software, and various other types of software. In general, applications heretofore available only by way of computing devices and/or Internet protocol (IP) based network devices are now available on such mobile devices. This expansion in capability of mobile devices has largely been effectuated by the recent fixed-mobile convergence.

The rapid growth of the telecommunications industry has fueled a strong competition for market share in mobile-IP communication devices and communication service plans. The growing need for expanded products and services has led to different vendors combining products, services and applications to meet the demands and the timetable of the market. As the complexity of the online mobile system has grown the requirement for maintaining the system and providing vendors and customers enough information to operate and use the mobile system has increased dramatically, the market now requires mobile communications vendors to provide guaranteed levels of performance and availability. Accordingly, a new or evolved service assurance system. Further, the new service assurance system must be capable of spanning the products and services of different vendors without placing an undue implementation burden on any one participant. In this fashion, the new assurance system must be capable of implementation on different system platforms and be able to share information across platforms so this information may be consolidated and reported to the benefit of the mobile system, the vendors and the customers.

As the mobile communication market increases, the number of mobile subscribers increase, and the voice and data demands of such subscribers evolve and become more complex, the support networks provided by legacy voice and next generation data services must evolve as well. To meet this ever growing need, the mobile system must evolve to provide better incident management, problem management, lifecycle management and greater inter-domain coupling and automation. Accordingly, network architectures must adapt as numbers of subscribers and demands of such subscribers increase and evolve.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

One aspect of the subject disclosure is providing a service assurance domain to monitor, manage and maintain the services offered to customers. The subject disclosure includes dynamic resource management to support real-time, multimedia services, applications and devices. Additionally, service and subscriber level sources and policy management functions are extended to provide a higher level of granularity. Another aspect of the subject disclosure includes incorporating new service and customer management functions including the extension and correlation of more subscriber specific data sources to support incident management. In another aspect of the subject disclosure, actionable root cause analysis is provided to support problem management from the correlation and evolution of new and existing data sources. In another aspect of the subject disclosure, more sophisticated life cycle management functions are included involving shorter cycles and advanced change management, configuration management and release management. Another aspect of the subject disclosure includes greater inter-domain coupling and automation between service assurance and service fulfillment to provide customers with the levels of service and availability demanded by today's market.

According to further aspects of the subject disclosure, in addition to providing guaranteed levels of availability for the provided services, the vendor must also provide guaranteed levels of performance for the provided applications and services. With respect to this aspect of the subject disclosure, this is provided through continuous monitoring and collection of performance data. The collected data is compared in both a real-time and historical analysis to determine if the instantaneous and trended values of the collected data meet the specifications of the key performance indicators as defined for the network system.

According to one or more additional aspects of the subject disclosure, in addition to detecting availability and performance problems in real-time, the market now requires the resolution of the detected problems in real-time. An aspect of the subject disclosure targeted at the issue of resolving availability and performance problems in real-time includes embedding support functions of monitoring, processing and determining automated actions in the application runtime environment in a manner meeting the application needs. Another aspect of the subject disclosure accomplishing this requirement includes implementing an architecture supporting the availability and performance requirements at the resource, service and customer layers and implementing in-line solutions that provide faster processing and reporting to a granularity required by market demand.

Another aspect of the subject disclosure includes seamlessly integrating the service assurance domain across both the existing wired and wireless networks. This is not intended to be an exhaustive list of supported networks for the subject disclosure and should any future network implementations arise the seamless integration would include any newly developed network technologies. An aspect of the subject disclosure includes extending the monitoring of the base protocols, including the application layer of the disparate networks to support an IP Multimedia Subsystem. Another aspect of the subject disclosure includes extending the root cause analysis across the disparate networks to localize system problems to a particular network and sending key threshold crossing alerts to the applicable network operation center.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
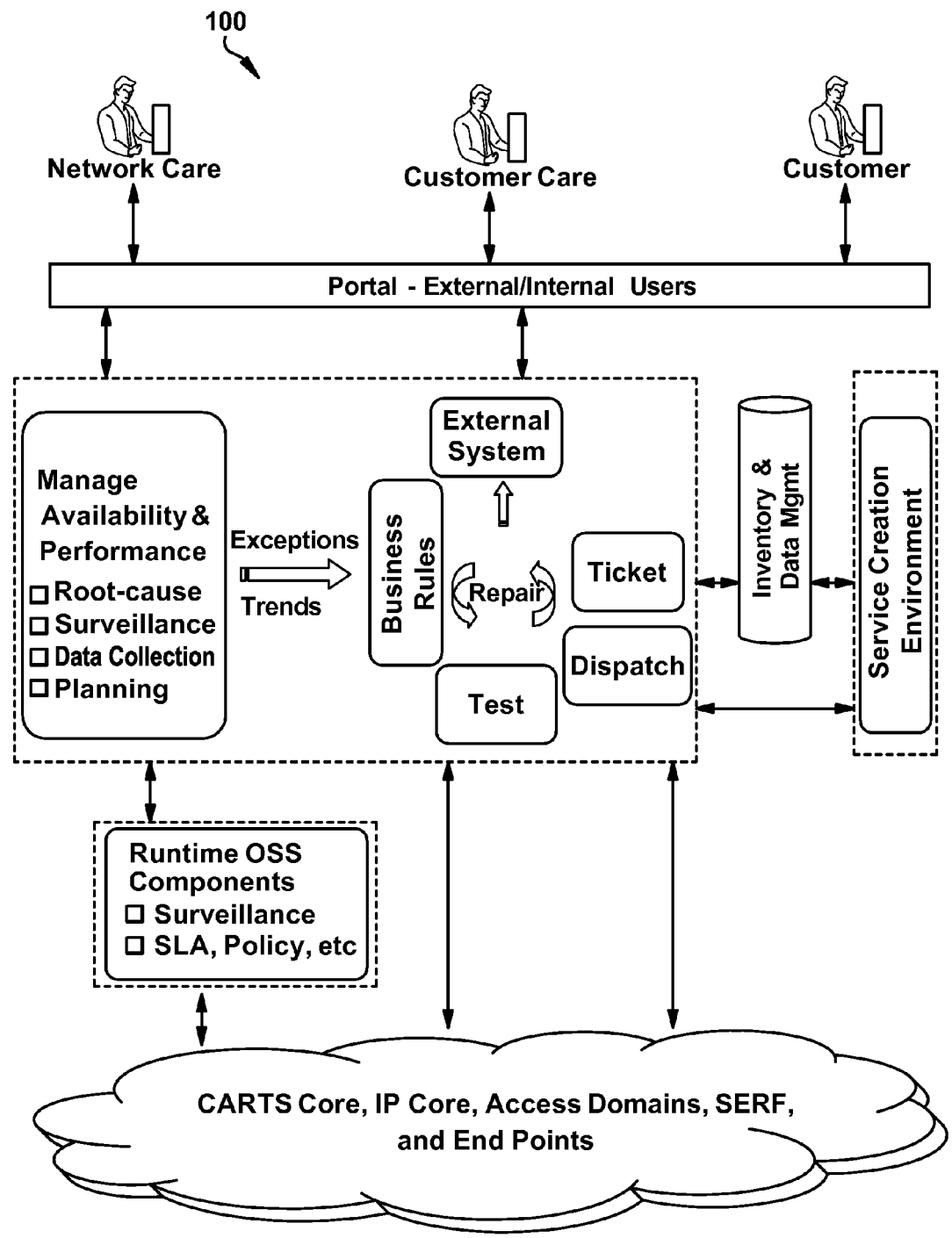
FIG. 1 depicts a block diagram of a sample system for Service Assurance according to aspects of the subject disclosure.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component," "system," "equipment," "interface", "network," and/or the like are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

The service assurance domain provides resources to vendors and customers to monitor, manage and maintain the services provided by a network. Included in this domain are capabilities to monitor and manage the underlying infrastructure of customer devices, networks, servers and applications. The combination of these tools will allow the assurance of levels of service consistent with the expectations of the customers, either perceived or contracted. The levels of service include both availability and performance of applications and services.

Accomplishing the elements of the innovation requires extending traditional service assurance functions to a greater level of granularity and making the functions real-time. In one aspect of the subject disclosure, dynamic resource management is provided to support real-time operations of applications and devices and multi-media services. This includes but is not limited to extending more granular service and subscriber level sources. In another aspect of the subject disclosure, the extension of the network services are accomplished by extending and correlating the subscriber specific data sources to support incident management at the individual user level. For example, an automated repair function can be initiated on the occurrence of a specific problem for one user rather than waiting for the problem to affect a pool of users before initiating action on the problem. In another aspect of the subject disclosure, the problem management function is extended and correlated to provide actionable root cause analysis. For example, the problem management function will perform an analysis with sufficient and detailed data to differentiate between a problem and its associated symptoms and therefore provide guidance to correct the problem rather than correcting symptoms and hiding the problem for future manifestation with different symptoms. Another aspect of the subject disclosure involves implementing more sophisticated life cycle management functions involving shorter cycle times and including change, configuration and release management. Another aspect of the subject disclosure includes greater inter-domain coupling and automation between service provider and service consumer with respect to policy management.

In addition to the foregoing, it should be appreciated that the claimed subject matter can be implemented as a method, apparatus, or article of manufacture using typical programming and/or engineering techniques to produce software, firmware, hardware, or any suitable combination thereof to control a computing device, such as a mobile handset, to implement the disclosed subject matter. The term "article of manufacture" as used herein is intended to encompass a computer program accessible from any suitable computer-readable device, media, or a carrier generated by such media/device. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave generated by a transmitter can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, the terms to "infer" or "inference", as used herein, refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring to the drawings, FIG. 1 depicts a block diagram of a sample system 100 Service Assurance Domain. In one aspect, system 100 includes functionality for a monitoring plane including passive and active monitoring. In another aspect the system 100 includes functionality for processing system exceptions generated to indicate a problem with the system. In another aspect the system 100 includes a business rules function for determining the priority of a detected problem. For example, a network application may become unavailable and the exception generated is forwarded to the business rules function to determine the appropriate action and timing of a resolution. The business rules function might determine that the application is critical to many customers and therefore issue a ticket to correct the malfunction, including a time period after which the applications offline status would be contrary to the commitment made to one or more customers for application availability. In a circumstance of an issue being of a critical nature and of a particular resolution type capable of automatic resolution, the system may take automatic action to resolve the problem and report the problem and the resolution to a system log.

In another aspect of the subject disclosure, management of the service assurance domain may be carried out by a third party. The third party may be an associated vendor or a customer. The third party accesses the service assurance domain through an interface portal over a networked connection, such as a browser, shared by the internal users of the service assurance domain. The portal provides security for the third party users to validate they are authorized to access the management functions. The management functions available to a third party are not necessarily the same as the management functions available to another third party. In this manner, third party vendors and customers may all see the same information at the same time associated with their view of the service assurance domain and therefore may provide valuable information to maintaining and improving the service assurance domain.

In another aspect of the system 100 subject disclosure, additional run-time operations support systems are implemented. This includes implementing functionality and interfaces of the service oriented architecture in areas such as user devices previously without this functionality. The dynamic resource management supports real-time multimedia devices, services and applications. In another aspect of the subject disclosure implementation, the runtime combines policy/SLA management at all layers including but not limited to resource, service/enabler and customer. In another aspect of the subject disclosure, the dynamic resource management capabilities are available in the service creation environment as application programming interfaces so they may be included in any new services and seamlessly integrated into the service assurance domain.

In another aspect of the subject disclosure, service categories are implemented for base protocol analysis, multimedia mean opinion scores and applications or devices involving logic and context. In the base protocol analysis, functionality for monitoring, managing and reporting on latency, jitter, dropped packets and service availability is included. This information may be transmitted across layers and retained for subsequent historical analysis.

Another aspect of the system 100 disclosure includes managing availability, accuracy and performance with passive and active monitoring. Every service is measured by these three key indicators. A service must be continuously available for the intended lifetime of the service. A service must provide accurate information with regards to the type of information provided. For example, information provided to a user related to an AGPS determined position can be validated by standalone GPS hardware or position markers and returned to the system to automatically adjust a database and improve accuracy. A service must also perform at a level consistent with its design expectations. Accomplishing these goals of availability, accuracy and performance requires another aspect of the subject disclosure related to the monitoring plane. This innovation monitors availability, accuracy and performance across both the service plane and the control plane. In one aspect of the subject disclosure, the service plane includes the various paths and elements in those paths traversed by the data, voice, video, etc. making up the subject of the service. In another aspect of the subject disclosure, the control plane includes the paths and elements in those paths traversed by signaling or control of routes, capacity, reservations, policy, etc. for the purpose of managing and maintaining the service. Both of these planes may traverse multiple providers.

Across the monitoring plane, the availability, accuracy and performance monitoring may be accomplished by either passive or active monitoring. In one aspect of the subject disclosure the passive monitoring is accomplished by various elements in the service and control planes. Passive monitoring is implemented without interfering with the flow of information in the service path and is made available through capabilities such as management information bases, usage records, log files or strategically placed probes that passively measure key process indicators. In another aspect of the subject disclosure, active monitoring is accomplished by emulating service usage in the service and control planes. Typically, strategically placed probes actively measure key process indicators of interest. The service emulation provides minimal interference with the flow of information in the service path and the results of the service emulation are captured in much the same way as information from passive monitoring.

Another aspect of the subject disclosure relates to the correlation of the information provided by the passive and active service monitoring. As information in the form of events becomes available from monitoring the service and control planes, it must be correlated with respect to time, layers and domains. For example, with respect to a time correlation, a chronological series of events leading to a certain condition are recognized as such and form a path to follow for a subsequent root cause analysis. Another example, with respect to layers, allows the correlation of a series of related events leading to a condition provide a path to trace the root cause to a particular layer. Another example, with respect to domains, allows the correlation of a series of related events that would indicate the root cause problem as a particular type of handset or equipment owned by the customer.

In another aspect of the subject disclosure, an end-to-end graphical view of the service, application environment or device is provided. The end-to-end view will provide underlying details regarding impacted services, applications and/or devices and allow the user to drill down into the graphic display to specific components to view more detailed information related to the impacted area. In another aspect of the subject disclosure, the ability to obtain detailed specific component information will be available programmatically to facilitate the real-time response to investigated problems. The problem resolution may be accomplished manually or automatically depending on the particular circumstances of the issue. In another aspect of the subject disclosure, end-to-end views based on a particular customer are provided for account management and customer service.

Another aspect of the system 100 disclosure includes making decisions and taking automated actions based on the information provided by the service assurance domain monitoring. After detection, correlation and root cause analysis, the timely resolution of identified problems is critical to the system. In one aspect of the subject disclosure, automated tests are invoked for further segregation of the problem. In another aspect of the subject disclosure, the system may reset one or more subsystems to resolve the identified condition. In another aspect of the subject disclosure, the condition and other information may be communicated to other systems or subsystems for invocation of policy based controls for resolution of the identified condition. For example, a communication may be sent to request allocation of additional resources such as storage space or bandwidth. In another aspect of the subject disclosure, a communication may be sent to request additional resolution. For example, a work order may be generated and sent to maintenance to replace a failed piece of hardware. In another aspect of the subject disclosure, a communication may be sent for administrative action. For example, a failed use of a service may prompt an action for a refund or a request for additional capacity may generate a billing.

The system 100 supports end-to-end management including third party applications, services and devices. One aspect of the subject disclosure provides the ability to design to and distinguish between performance and availability impacts contributed by each party therefore allowing for the generation of third party specific reports. Another aspect of the subject disclosure includes converging development and life cycle processes to support optimized network, application and service deployment. Included in this convergence is alignment across functional organizations including but not limited to marketing, network support and operations support. Another aspect of the subject disclosure includes high level architecture and detailed architecture as part of the Technology Network Realization Process (TNRP) a marketing process for realizing products and services called Product definition Process (PDP). The aligned processes support end-to-end testing and lifecycle management, involving 1) applicable organizations and necessary functions such as First Office Application (FOA) pre-deployment testing to install applications, validate critical features such as availability and product acceptance; and 2) Lifecycle management including patches, upgrades, firmware updates, third party changes, backup and restore, report card and vendor management functions.

Another aspect of the system 100 disclosure includes third party SLAs linked to the development process and tiered according to Business Impact Assessment (BIA). The Technology and Product Realization (T&PR) Team in conjunction with the Product Team prioritizes services from a disaster recovery perspective based on Business Impact Criteria, weighing various financial and operational criteria such as revenue impact, revenue/cost assessment, number of subscribers, corporate reputation (i.e. risk of negative publicity), competitive advantage, operational dependencies—inter-carrier, inter-service, regulatory/legal mandates, and criticality in time of disaster (substitution for voice services). Recovery objectives are categorized into 1) Recovery Time Objective (RTO)—time to recover the system; and 2) Recovery Point Objective (RPO)—age of the data being recovered. Business Impact Assessment priorities and their associated objectives are:

| | | |
|---|---|---|
| Continuous Running | Priority 0 | RTO 0/RPO 0 |
| Mission Critical | Priority 1 | RTO = <48 hr · s/RPO = <24 hr · s |
| Critical | Priority 2 | RTO 3-10 days/RPO 48 hr · s |
| Essential | Priority 3 | RTO 11-30 days/RPO 7 days |
| Non Essential | Priority 4 | RTO after all others recovered/RPO 7 days. |

BIA determines the service assurance priority which in turn drives key metrics and design principles. Business impact assessments are reassessed as needed and all consumer or enterprise services should be prioritized from priority 1 to 3.

In another aspect of the subject disclosure, third party management information bases (MIBs) are extended for further operational automation and SLA auditing, particularly when they impact BIA critical services. Interfaces are provided allowing service, application and device specific threshold crossing alert notifications for conditions related to at least availability, latency and capacity. State changes in the indicated areas will generate automatic notification to all applicable parties as well as update audit and non-performance compensation reports including performance issues such as root cause and maintenance issues such as down time. For example, service performance degradation can generate an email or an short message service (SMS) notice to internal and/or applicable third parties advising them of the degradation in performance.

Another aspect of the subject disclosure includes online access to customer SLA reports by applicable customers after internal validation and representative trials. Initially, generic per service SLOs/SLAs are established during service on-boarding then customer specific performance baselines are established after the validation period. The reporting can be accessed by service and by enterprise. In another aspect of the subject disclosure, there are multiple levels of support for Summary Service Quality Reports. The levels of quality reports include coarse-grained via national, regional or market-based statistics or Fine-grained with a premium price, or to serve as a competitive advantage, extending SLOs/SLAs to report subscriber level performance. Another aspect of the disclosure includes extending order handling metrics to incorporate shortened time cycles such as provisioning intervals and subscriber devices such as shipping times. Another aspect of the subject disclosure includes extending the network and service performance metrics to incorporate session oriented key process indicators such as accessibility, retainability and throughput across services.

The system 100 supports runtime operations support system components through architecture that measures service lifetimes in seconds to minutes rather than the normal service lifetime of months to years. Accordingly, the service assurance implementation in addition to detecting errant conditions in real-time, must also correct these detected conditions in real-time. In another aspect of the subject disclosure the functions of monitoring, processing and determining automated actions must be embedded in the run-time environment in a manner meeting the needs of the application. For example, service assurance functionality would be facilitated by implementing an architecture supporting contractual service obligation management at the resource, service/enabler and customer layers and by using in-line solutions for faster processing and reporting to customer granularity. In another aspect of the subject disclosure, to support the policy management at the resource, service/enabler and customer layers, the service oriented architecture must be extended into the operations support systems and the business support systems.

Standards such as the Organization for the Advancement of Structured Information Standards (OASIS) already exist to create consensus in these areas among vendors. OASIS specifications currently exist and support many service and customer management functions. The Management Using Web Services (MUWS) specification supports device management, events and metadata for metrics. The Management of Web Services (MOWS) specification incorporates availability and notification. The Functional Elements Specification (FES) supports unified access of integrated data, data synchronization, error management, internal/external application error for third party management, notifications (by email, Short Message Service (SMS), web service or document), security, product catalog, reporting, policy management, quality of service (QoS), device supportability, service level management, service level enforcement and service registry functions.

Another aspect of the subject disclosure includes extending the TMF Multi-Technology Operations System Interface (MTOSI) service configuration formats beyond order support to support service assurance. For example, in order to correlate with the network over which it rides and to provide stronger support for root cause analysis. Implementing the service oriented architecture at the upper layers of the architecture also will support both process improvement methods such as Six Sigma and exposure of services to third parties.

Another aspect of the subject disclosure includes strategically architecting source service and customer management solutions to cover categories of services, protocols, media or technology rather than developing a solution to support each service. Implementing support by service type provides for a lower cost of operation by eliminating the requirement for redundant management solutions.

Another aspect of the subject disclosure includes an architecture supporting related media across a merged wireless and wire-line network incorporating optimization and competitive differences across technologies. Optimization includes but is not limited to algorithms, key process indicators, service level degradation thresholds to Network Operations Centers (NOC), etc. For example, within the video domain, Mean Opinion Scores (MOS), involving additional post-processing are used to evaluate subscriber perceived quality. Another aspect of the subject disclosure includes determining the correlation between video RTCP latency/jitter and end user perception to evaluate wireless video performance.

Another aspect of the subject disclosure includes monitoring and collection of data for analysis and reporting. For example, GSM enhanced measurement reports covering call setup delay with coverage metrics every 480 milliseconds. Call detail records such as OMA/3GPP reporting bearers, protocols, QoS profile, expected throughput, failure cause code, etc. Another aspect correlates call detail records by subscriber or multiple subscribers for performance reporting on multi-party sessions/calls. Metrics may also be aggregated by enterprise, service, traffic class, etc. Extended data records may be used to provide an intermediate check of message reliability and processing status. Another aspect includes device metrics reported to indicate perceived customer experience and end-to-end metrics including round trip time, jitter, setup delay, bandwidth usage, number of concurrent incoming and outgoing streams by subscriber and other metrics that are most accurate when measured from the device.

Another aspect of the subject disclosure includes dynamically shifting application functionality. In this regard, the distribution of application functionality between the device and the server will shift as the load on the device and the server vary during the session/call time. For example, a determination that a user is involved in chatty behavior would result in a dynamic shift of more of the application load placed on the device. In a similar fashion, a determination may result in a change in the period of data collection from a given device because a more accurate analysis of the end-to-end metrics is possible with data collected from a longer sample period. In another aspect, the server will monitor the device with respect to resource allocation on the device and upon analysis make recommendations to the user concerning the device. For example, the user may receive a recommendation of a more appropriate device for future purchase or a suggestion to make a memory upgrade or delete an unused or expired application. In concert with the dynamic load balancing these recommendations would benefit both the user and the system. Another aspect of the subject disclosure includes application post-implementation analysis. In this regard, data on application usage as a function of individual and group usage could be analyzed to determine if the application could be redesigned in a more efficient implementation with respect to network and device resources.

Another aspect of the subject disclosure includes extending alarm pattern recognition to devices. Implementing the alarm pattern functionality includes but is not limited to 1) active test for "alive" state; 2) periodic load test covering most paths; 3) reportable alarms generated by the applications business logic; 4) collection of log files detailed to the lowest state machine level; and 5) data mining support for report generation. In another aspect of the subject disclosure, the log files include full and complete context for every event in the service including user interface elements and exception logging. Another aspect includes data mining support for browsing across volumes and timeframes to the level of an individual phone call or session. Another aspect of the innovation includes device metrics on dropped calls, relationship to signal strength, tcp errors, 2G/3G network handovers and their correlation to abandonment of high bandwidth application usage, etc.

Figure 2:
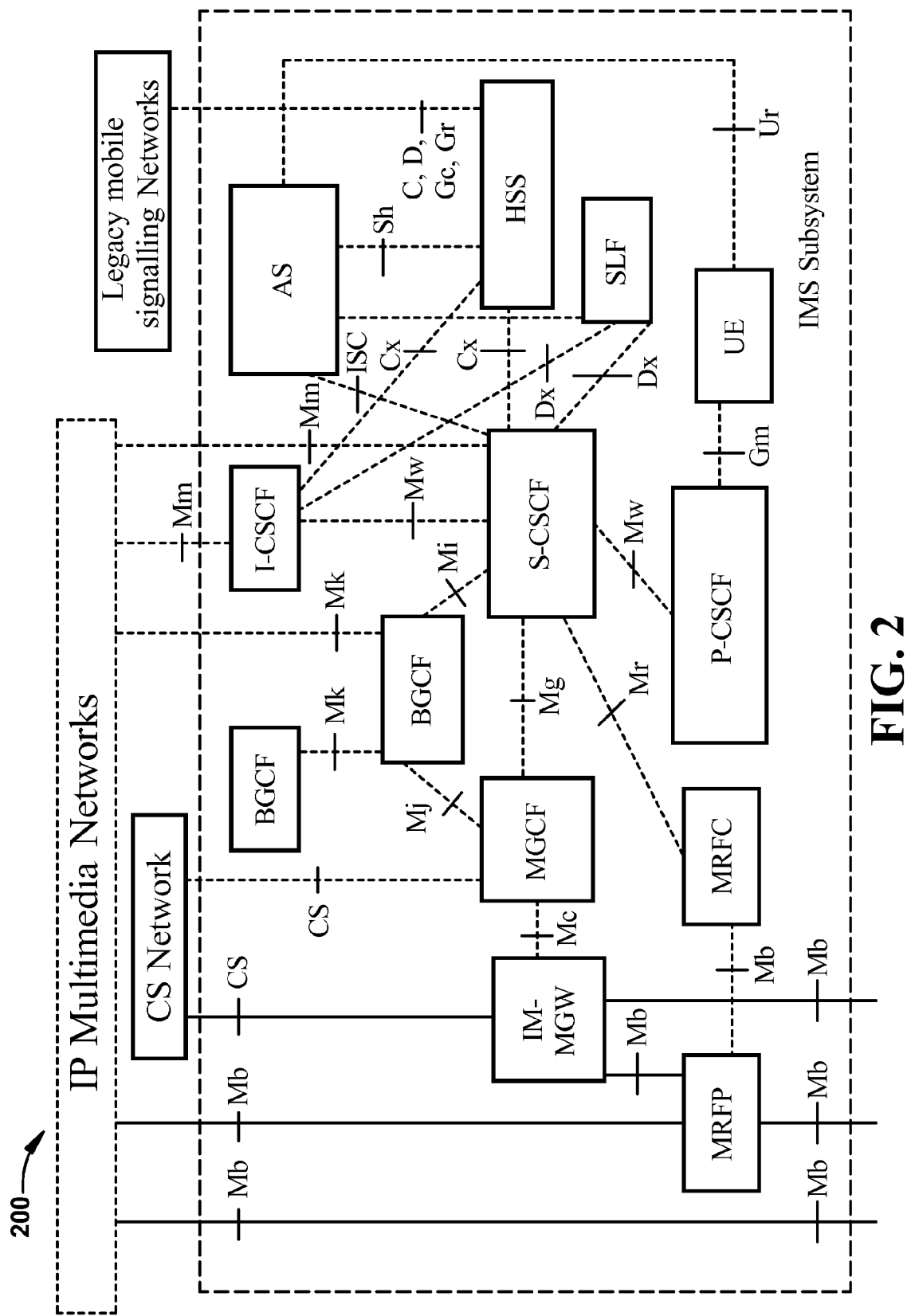
FIG. 2 depicts a block diagram of an example IP Multimedia Network and its associated interface.

The subject disclosure also includes log file analysis, aggregation and transmission from the device based on the state of the device. For example, the device might defer these activities until it met the state criteria of charging and idle and good signal. Another aspect includes a mobile alarming gateway using the customer mobile device to report asynchronously a BTS/RBS/Node-B related outage when connectivity is lost between BTS and BSC and deliver it when user enters an unaffected area. Another aspect includes the ability to remote device troubleshoot by performing a smart ping and capturing context information. Another aspect includes providing the user an alert number such as *## to dial when service issues occur. The user dialing the alert number would trigger a device initiated context collection and transmission. For example the user might experience poor service/signal, dropped call, voice breakup, etc. The device would send the data immediately if possible or as soon as sufficient service returns. This could also trigger a service affected discount and/or a trouble reported bonus against the customer account Referring to the drawings, FIG. 2 depicts a block diagram of a 3GPP system 200 for an IP Multimedia Subsystem (IMS). An aspect of the system 200 subject disclosure includes extending the monitoring capabilities of the base protocols, including the application layer, to support the IMS. In another aspect of the subject disclosure, monitoring at Cx on the path from CSCF to HSS, supporting call trace to ensure call detail record generation and supporting H.248 on Mp if MRFP and MRFC are not integrated.

Another aspect of the subject disclosure includes extending the root cause diagnosis capability to localize issues across the merged network and sending key threshold crossing alerts to network operations centers. Included in the subject disclosure is coverage of wire line and wireless networks and protocols including but not limited to 3GPP releases and infrastructure vendor releases and application layer protocols. An additional aspect includes further localizing network impairments by extending support for noting and tracking delay between nodes, for example latency, jitter and packet loss. In another aspect of the subject disclosure, network based packet inspection is implemented. The network based packet inspection utilizes thresholds to identify common service impairments, incorporating varying thresholds if needed for different technologies such as wire line and wireless. Another aspect of the subject disclosure includes a prioritization system to rank impairments on system defined criteria for establishing the order to address multiple impairments.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

It should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, media, or a carrier in conjunction with such computer-readable device or media.

Figure 3:
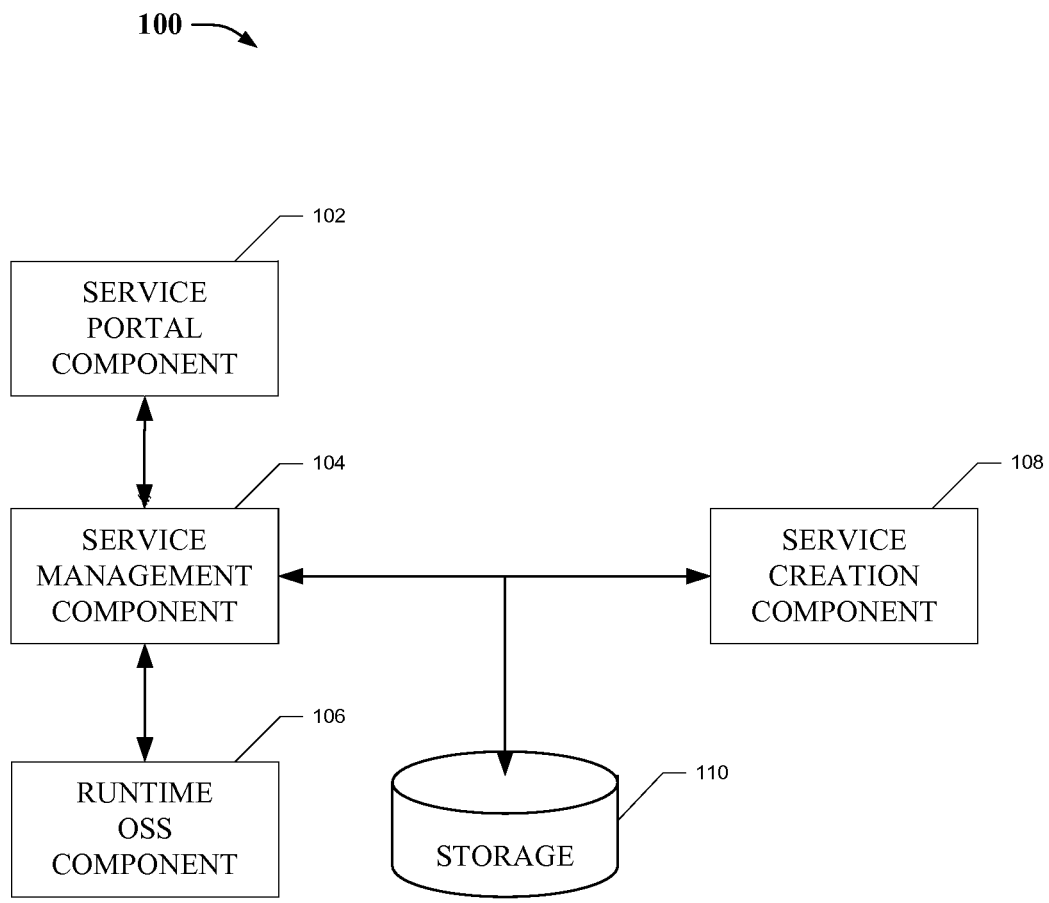
FIG. 3 illustrates a sample operating environment providing processing, memory and/or communication functions for various aspects described herein.

FIG. 3 depicts additional aspects of the service assurance domain system 100 including a service portal component 102, a service management component 104, a runtime OSS component 106, a service creation component 108 and a storage component 110. The service portal component 102 provides for interaction between the service assurance system 100 and the users of the service assurance domain system 100. The service management component 104 provides for the sampling of data and analysis associated with detecting a system failure and where possible, automatically correcting the error. The service management component can also report on the error condition and request other resources to help correct the problem. The runtime OSS component provides the interface to the services and applications and also can provide an extension of core services by third parties. The service creation component provides the ability for the service assurance system to create, start, and restart services and applications as directed by the business demands and agreements associated with the service assurance domain system 100. The storage component 110 provides persistent storage for applications, services, reports and data collected concerning the operation of the service assurance domain system 100. The data can be related to system efficiency, capacity, downtime, billing information or any other information associated with the operation and maintenance of the service assurance domain system 100.

Figure 4:
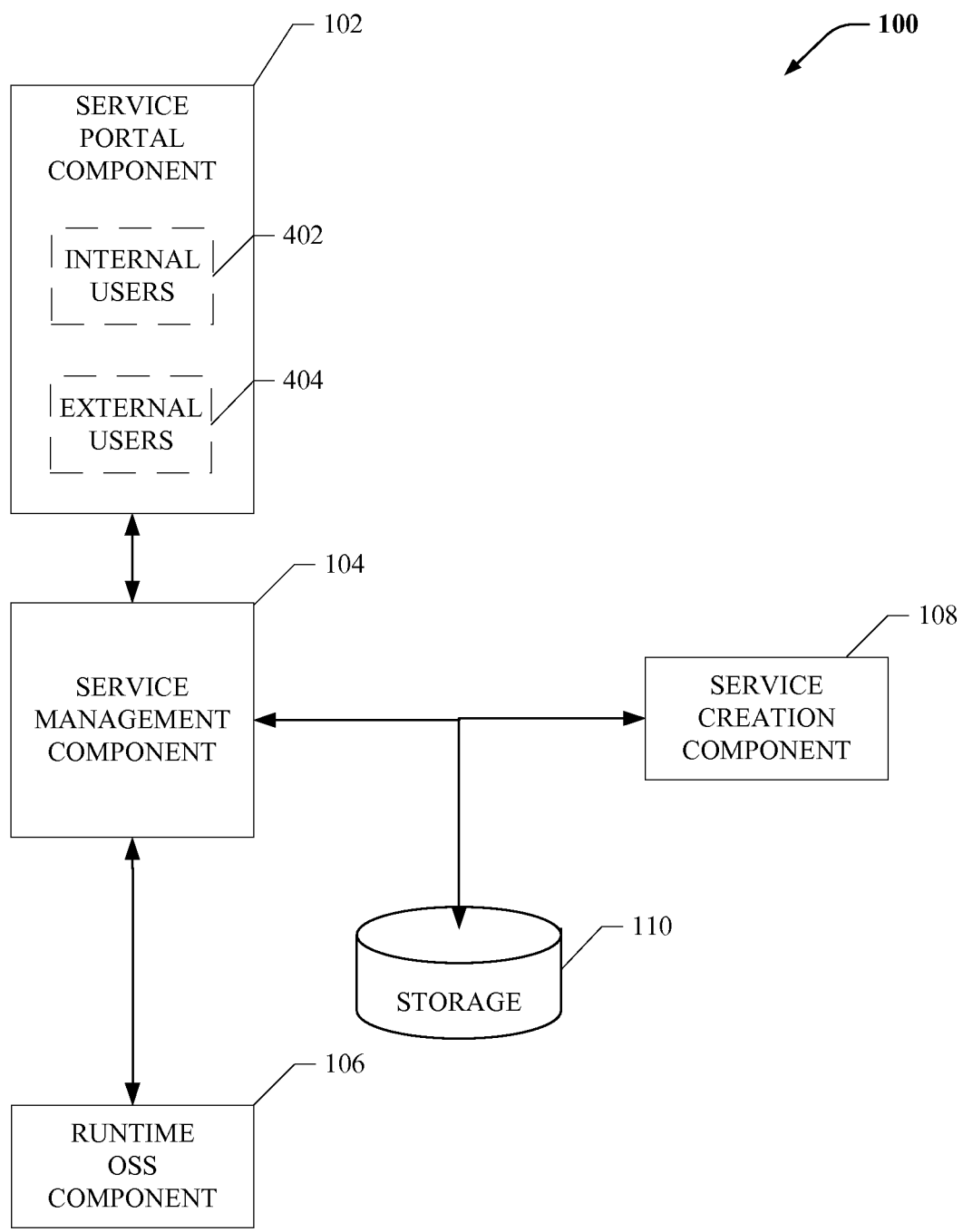
FIG. 4 illustrates further aspects of the service assurance domain system in accordance with an embodiment.

In another aspect of the service assurance domain system 100 illustrated in FIG. 4, the service portal component contains the interface to internal customers 402 and external customers 404. The internal customer 402 interface allows a specific group of users to administer the service assurance domain with respect to at least configuration and maintenance. Based on provided security credentials, a user can also review business usage information of specific applications related to specific customers. The internal users 402 can also set configuration data such as but not limited to the allowable amount of bandwidth and the allowable amount of storage space for a particular customer and/or a particular application. The external customer 404 interface provides the ability for customers to securely log into the service assurance domain for performing the same types of administration activities associated with their provided service or application. The customer can also log into the system as a user of the provided service or application. In either case, appropriate security credentials are required to allow access to the desired functionality.

Figure 5:
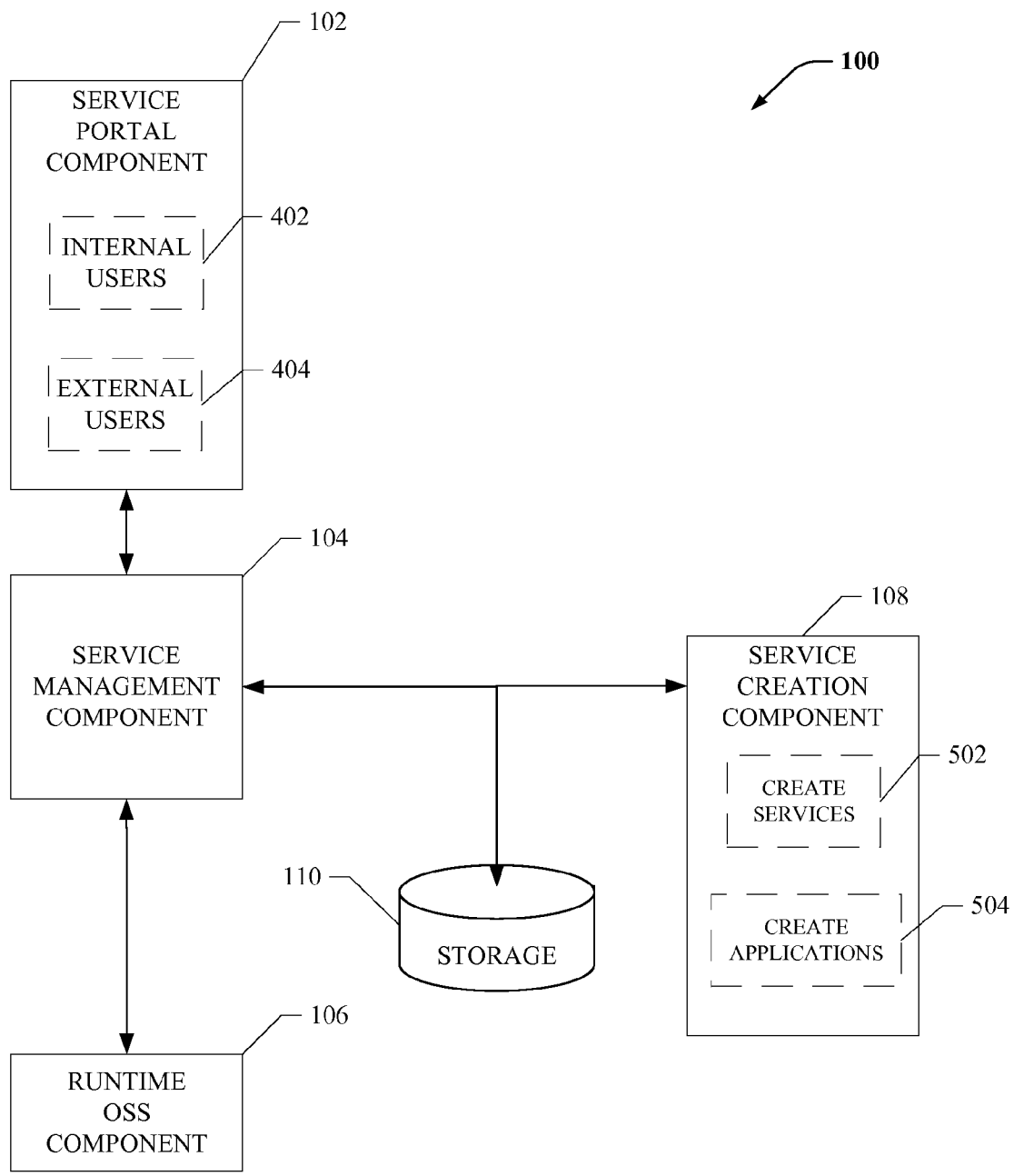
FIG. 5 illustrates further features of the service assurance domain system in accordance with an embodiment.

Turning now to FIG. 5, the service creation component 108 provides the ability through the service management component 104 to create services 502 and create applications 504. The service creation component 108 can be invoked by either internal or external users to add the required functionality to the service assurance domain system 100. The service assurance domain system 100 can also automatically invoke services or applications based on system loading and capacity. For example, the service assurance domain system can detect a slow response from a particular application based on a high number of users and start another instance of the application to balance the load and provide a better user experience. The service assurance domain system 100 can also restart services and applications that exited based on other problems associated with the service, application or network.

Figure 6:
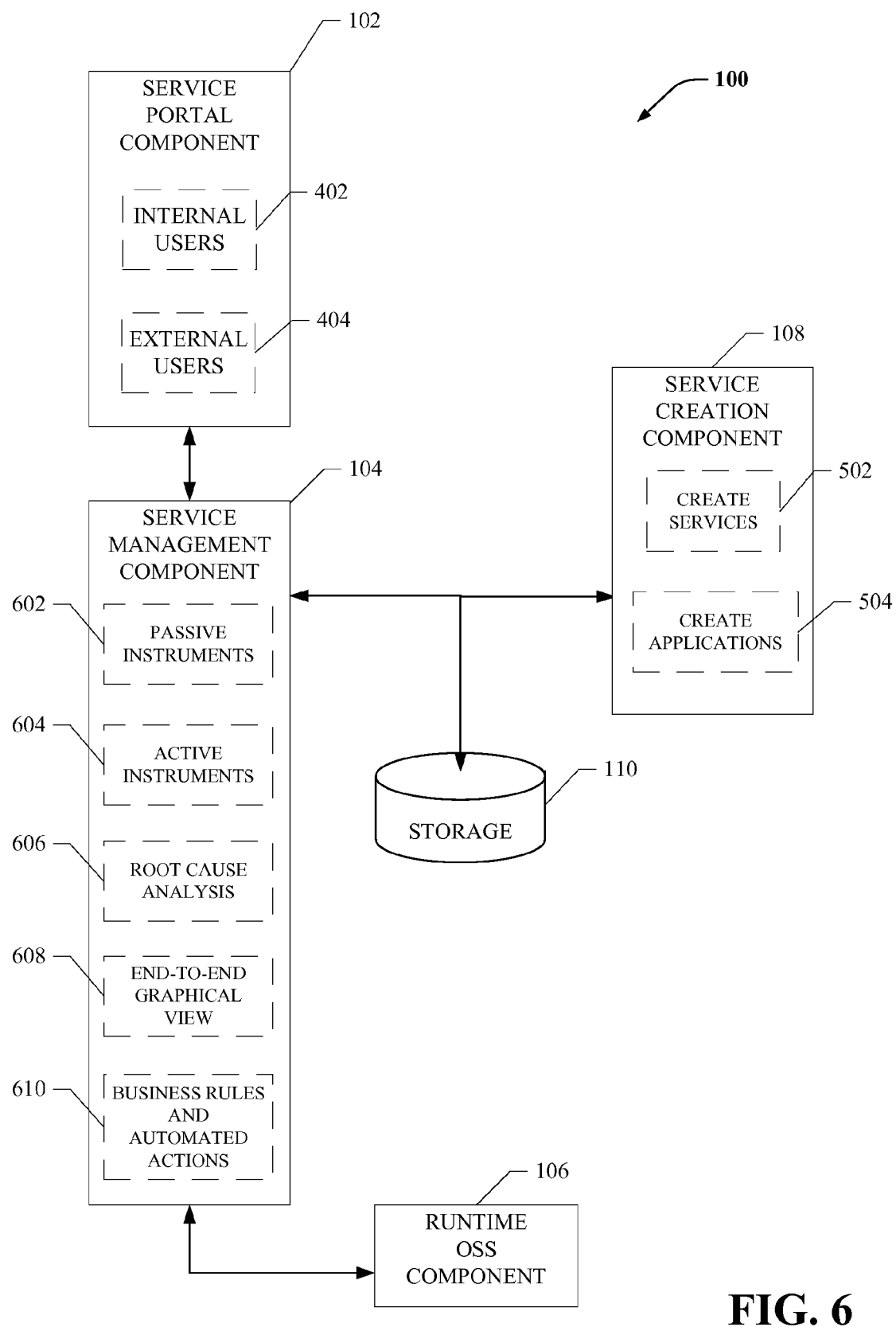
FIG. 6 depicts further aspects of the service assurance domain system in accordance with an embodiment.

In another aspect of the subject invention depicted in FIG. 6, the service management component 104 includes a passive instruments component 602, an active instruments component 604, a root cause analysis component 606, an end-to-end graphical view component 608 and a business rules and automated actions component 610. In one aspect of the subject invention, the passive instruments component 602 operates without interfering with the flow of information in the service path. The passive instruments component 602 interacts with management information bases, both standardized and proprietary, usage records, log files and strategically placed probes that passively measure key process indicators of interest. The passive instruments component 602 can operate in both the service plane and the control plane. In another aspect of the subject invention, the active instruments component 604 interacts with the assurance domain system 100 with strategically placed probes that actively measure key process indicators of interest. Accomplishing the required measurement results in a minimal interference with the flow of information in the service path. The active instruments component 604 can operate in both the service plane and the control plane. In another aspect illustrated in FIG. 6, the root cause analysis component 606 provides the capability to analyze the service assurance domain system 100 and the collected data to determine the fundamental cause of a detected or reported problem. This analysis also includes data based on third party application stability and end user loading. In another aspect of the subject invention, the end-to-end graphical view component 608 provides the ability for system personnel to observe the health of the service assurance system 100 and the associated services, applications, network and devices. The view presented by the end-to-end graphical view component 608 presents a different scope depending on the login and security credentials presented. In this manner, a consistent tool and view is presented for all personnel regardless of whether they are internal or external support. In another aspect of the subject invention, the business rules and automated actions component 610 provides for determining the severity of any given detected problem and attempting an automatic resolution if certain predefined criteria are met. For example, a customer service or application with required availability time can be restarted by the service assurance domain system 100 if the service or application becomes unavailable. The service assurance domain system can collect information related to the cause of the failure but will not wait for a manual restart by operations personnel because of contractual obligations related to availability. Accordingly, the automated actions can include restarting services or applications, generating work orders to replace hardware or dispatching repair personnel to the location of the problem.

Figure 7:
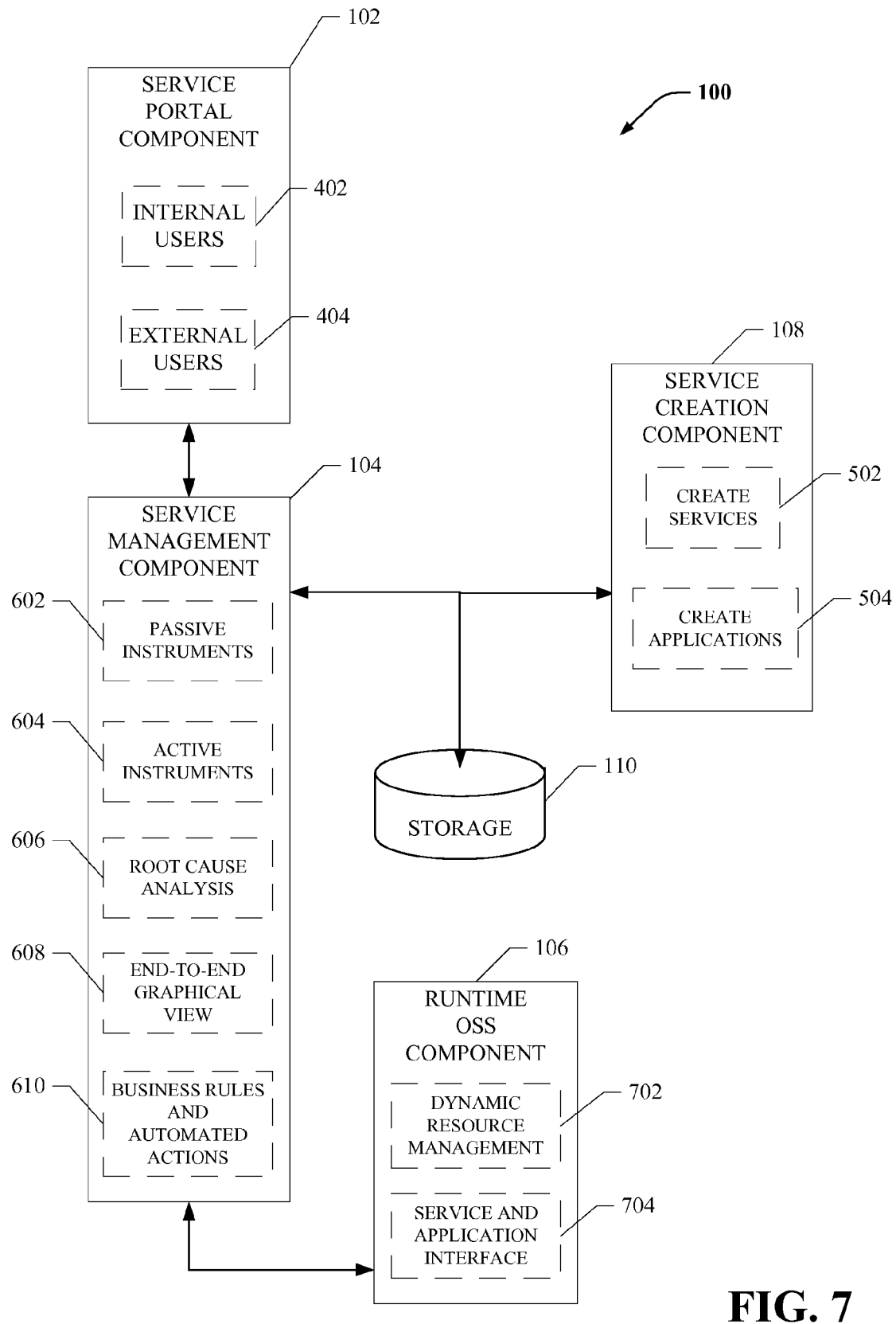
FIG. 7 depicts further features of the service assurance domain system in accordance with an embodiment.

Turning now to FIG. 7, the runtime OSS component 106 illustrates a dynamic resource management component 702 and a service and application interface 704. The dynamic resource management component 702 provides the ability to determine resource utilization of the service assurance system 100 and dynamically adjust resources to balance the service and application usage to provide better performance for all current users. For example, if a particular instance of an application becomes too slow or unresponsive because of the number of users then the dynamic resource management component 702 can instantiate another copy of the application on a different server and balance the load of existing users between the two copies of the application. In another aspect of the runtime OSS component 106, the service and application interface component 704 provides the interface between the service assurance domain, the internal and external users, and the services and applications, both system and those provided by third parties. In this manner, the service management component 104 can provide the diagnosis and repair capabilities and the tracking and billing information required to operate the services and applications.

Figure 8:
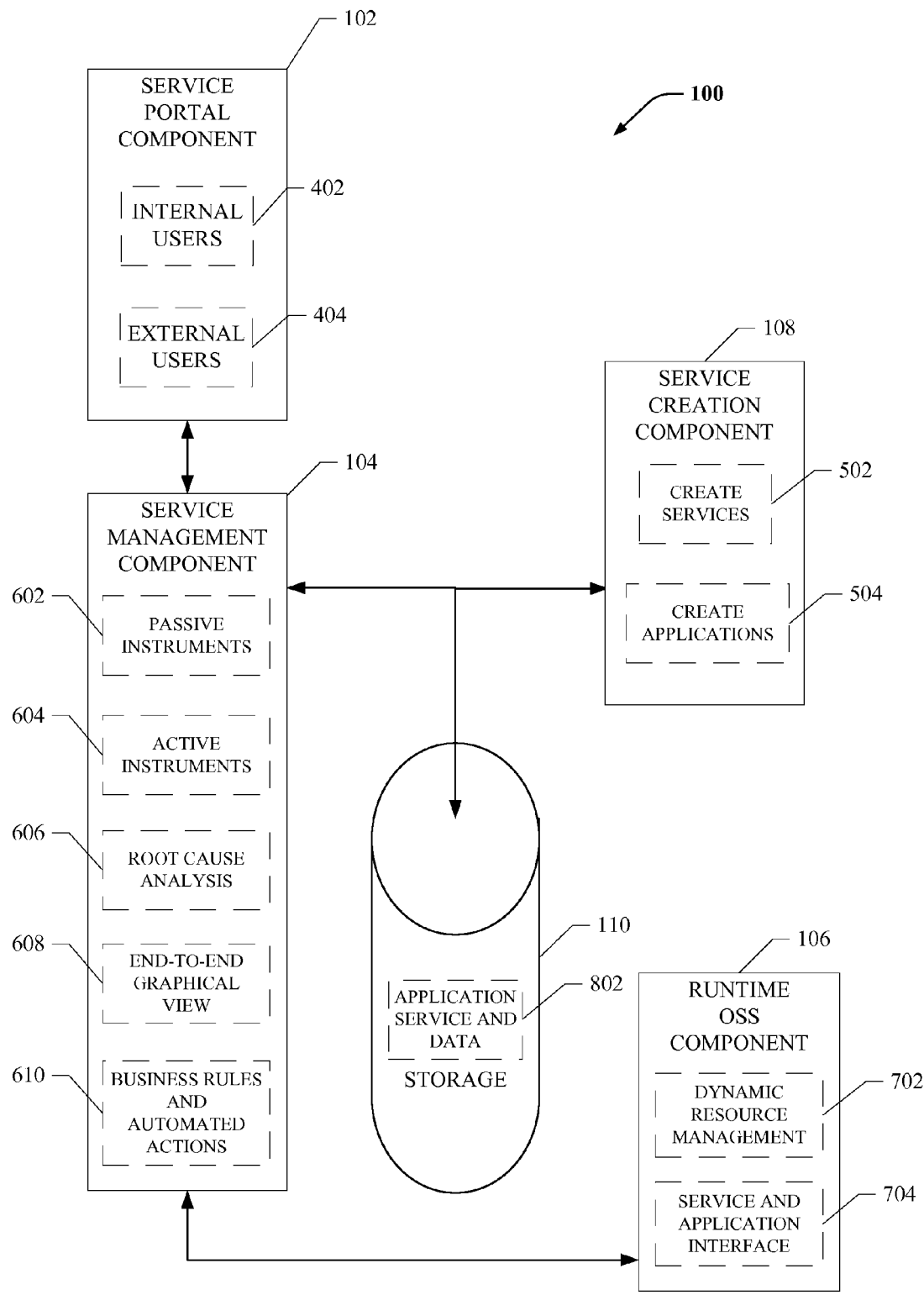
FIG. 8 illustrates further aspects of the service assurance domain system in accordance with an embodiment.

In another aspect of the subject invention, FIG. 8 depicts the storage component 110 and the application, service and data storage component 802. The application, service and data storage component 802 provides a system accessible storage location for copies of all applications and services. The service creation component 108 can obtain new copies of the applications and services should circumstances warrant a restart of a service or application or an additional copy based on performance or capacity issues. In another aspect of application, service and data component 802, the service assurance system 100 can store data required to diagnose problems and configuration information related to business requirements for access by the service management component 104.

Figure 9:
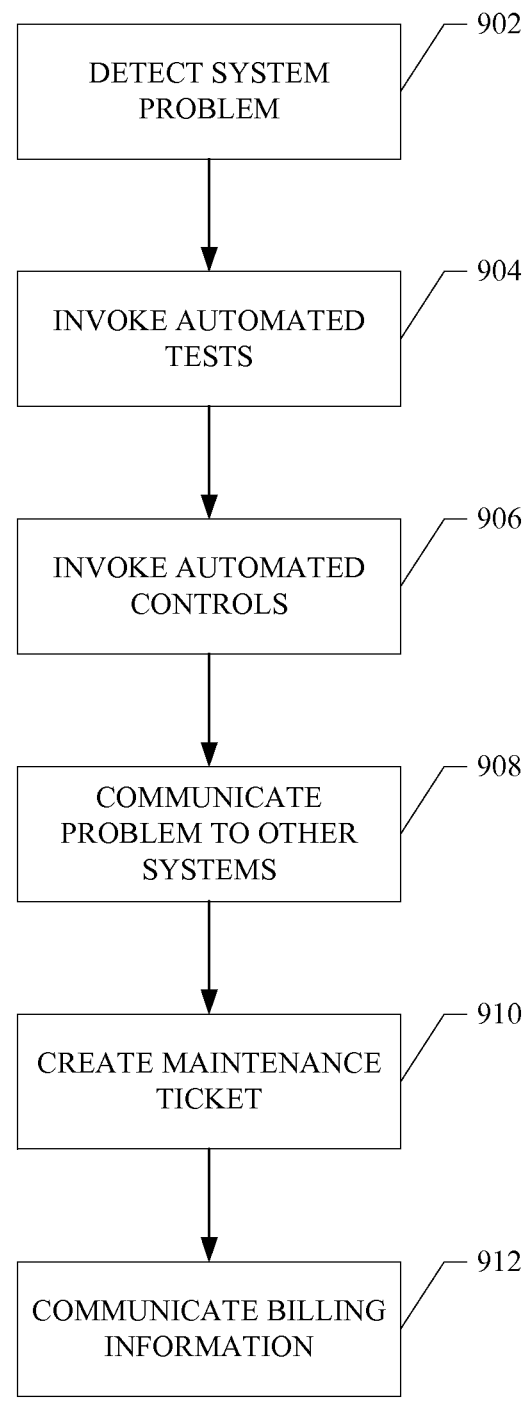
FIG. 9 illustrates a flowchart for automatically and dynamically detecting and correcting a system problem in accordance with an embodiment.

FIG. 9 depicts a flowchart of the method of automatically and dynamically detecting and correcting a system problem. At step 902, the service assurance system 100 detects the occurrence of a system problem. The system problem can relate to a service, application, network, or device failure. At step 904, the service assurance system 100 invokes automated tests to further isolate and identify the problem. The tests can include additional services or applications. Additionally, the assurance system 100 can invoke passive or active monitoring to collect data required to make a problem determination. At step 906, the service assurance domain invokes the simple automated controls to resolve the problem. One example of a simple automated control would be to reset the impaired service or application. At step 908, a communication identifying the problem is transmitted to other systems for invocation of policy based controls. For example, the allocation of additional bandwidth could be the appropriate solution to the problem. At step 910, a maintenance ticket is created by the service assurance system 100 and transmitted to the appropriate maintenance personnel. For example, if the problem is identified as failed hardware, such as a communications card, the service assurance system 100 would send a ticket to maintenance personnel responsible for repairing the affected hardware. At step 912, the service assurance system 100 transmits information to other systems such as management and accounting to make any required adjustments to billing, credit or capacity as dictated by the impact and duration of the problem and any future changes based on the problem resolution.

Figure 10:
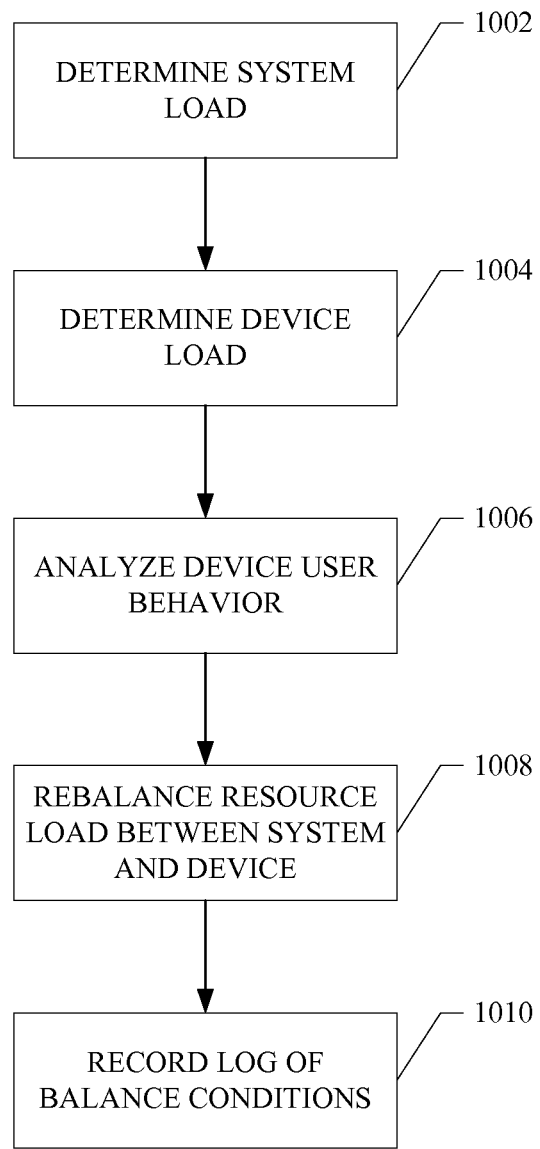
FIG. 10 depicts a method for load balancing between the network resources and the device resources in accordance with an embodiment.

In another aspect of the subject invention, FIG. 10 depicts a method of load balancing between the network resources and the device resources. At step 1002, the service assurance system 100 determines the load on the system based on a particular user's interaction with the network from his device. At step 1004, the service assurance system 100 determines the load on the user's device based on the use of a particular application. At step 1006, the service assurance system 100 analyzes the user's behavior with regard to such parameters as latency or device resources availability. At step 1008, the service assurance system 100 rebalances the load for the application between the network and the user's device. The goal of the rebalancing is to provide the user with a higher level of performance while reducing the load on the network. At step 1010, the service assurance system 100 records the data associated with the network conditions and the improvement obtained from the rebalancing. The data can be further analyzed later with regards to overall improvements in the efficiency of operating the network.

Figure 11:
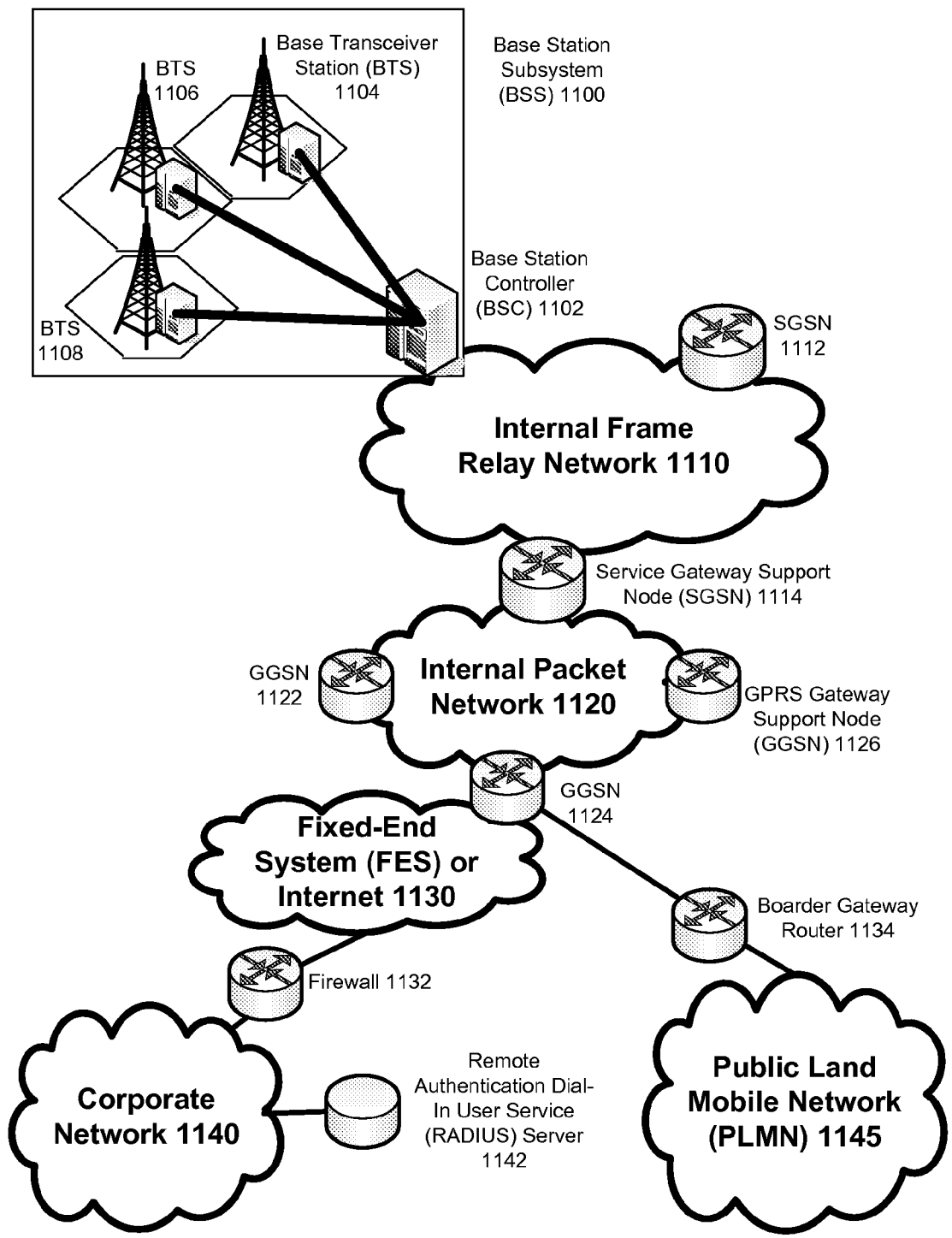
FIG. 11 illustrates an overall block diagram of a packet-based mobile cellular network environment in accordance with an embodiment.

FIG. 11 depicts an overall block diagram of an exemplary packet-based mobile cellular network environment, such as a GPRS network, in which the invention may be practiced. In such an environment, there are a plurality of Base Station Subsystems ("BSS") 1100 (only one is shown), each of which comprises a Base Station Controller ("BSC") 1102 serving a plurality of Base Transceiver Stations ("BTS") such as BTSs 1104, 1106, and 1108. BTSs 1104, 1106, 1108, etc. are the access points where users of packet-based mobile devices become connected to the wireless network. In exemplary fashion, the packet traffic originating from user devices is transported over the air interface to a BTS 1108, and from the BTS 1108 to the BSC 1102. Base station subsystems, such as BSS 1100, are a part of internal frame relay network 1110 that may include Service GPRS Support Nodes ("SGSN") such as SGSN 1112 and 1114.

Each SGSN is in turn connected to an internal packet network 1120 through which a SGSN 1112, 1114, etc. can route data packets to and from a plurality of gateway GPRS support nodes (GGSN) 1122, 1124, 1126, etc. As illustrated, SGSN 1114 and GGSNs 1122, 1124, and 1126 are part of internal packet network 1120. Gateway GPRS serving nodes 1122, 1124 and 1126 mainly provide an interface to external Internet Protocol ("IP") networks such as Public Land Mobile Network ("PLMN") 1145, corporate intranets 1140, or Fixed-End System ("FES") or the public Internet 1130. As illustrated, subscriber corporate network 1140 may be connected to GGSN 1124 via firewall 1132; and PLMN 1145 is connected to GGSN 1124 via boarder gateway router 1134. The Remote Authentication Dial-In User Service ("RADIUS") server 1142 may be used for caller authentication when a user of a mobile cellular device calls corporate network 1140.

Generally, there can be four different cell sizes in a GSM network—macro, micro, pico and umbrella cells. The coverage area of each cell is different in different environments. Macro cells can be regarded as cells where the base station antenna is installed in a mast or a building above average roof top level. Micro cells are cells whose antenna height is under average roof top level; they are typically used in urban areas. Pico cells are small cells having a diameter is a few dozen meters; they are mainly used indoors. On the other hand, umbrella cells are used to cover shadowed regions of smaller cells and fill in gaps in coverage between those cells.

Although not required, the claimed subject matter can partly be implemented via an operating system, for use by a developer of services for a device or object, and/or included within application software that operates in connection with one or more components of the claimed subject matter. Software may be described in the general context of computer-executable instructions, such as program modules, being executed by one or more computers, such as clients, servers, mobile devices, or other devices. Those skilled in the art will appreciate that the claimed subject matter can also be practiced with other computer system configurations and protocols, where non-limiting implementation details are given.

Figure 12:
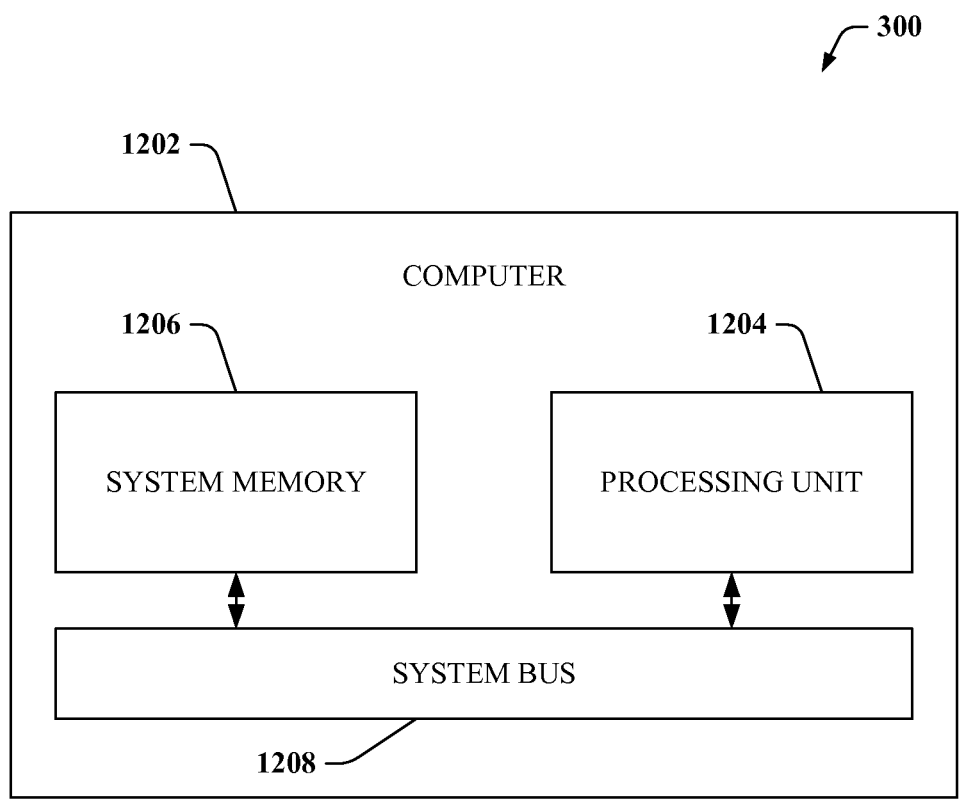
FIG. 12 illustrates a block diagram of a computing system operable to execute the disclosed systems and methods, in accordance with an embodiment.

Referring now to FIG. 12, there is illustrated a block diagram of a computer 1202 operable to provide networking and communication capabilities between a wired or wireless communication network and a server and/or communication device. In order to provide additional context for various aspects of the claimed subject matter, FIG. 12 and the following discussion are intended to provide a brief, general description of a suitable computing environment 300 in which the various aspects described herein can be implemented. While the description above is in the general context of computer-executable instructions that can run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, micro-processor-based or programmable consumer electronics, and the like, each of which can be operatively coupled to one or more associated devices.

The illustrated aspects of the claimed subject matter can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Suitable combinations of the any of the above should also be included within the scope of communication media derived from computer-readable media and capable of subsequently propagating through electrically conductive media, (e.g., such as a system bus, microprocessor, data port, and the like) and/or non-electrically conductive media (e.g., in the form of radio frequency, microwave frequency, optical frequency and similar electromagnetic frequency modulated data signals).

With reference again to FIG. 12, the exemplary environment 300 for implementing various aspects includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors, such a single core processor, a multi-core processor, or any other suitable arrangement of processors. The system bus 1208 can be any of several types of bus structure that can further interconnect to a memory bus (with or without a memory controller), a peripheral bus, and a local bus using any of a variety of commercially available bus architectures. The system memory 1206 can include read-only memory (ROM), random access memory (RAM), high-speed RAM (such as static RAM), EPROM, EEPROM, and/or the like. Additionally or alternatively, the computer 1202 can include a hard disk drive, upon which program instructions, data, and the like can be retained. Moreover, removable data storage can be associated with the computer 1202. Hard disk drives, removable media, etc. can be communicatively coupled to the processing unit 1204 by way of the system bus 1208.

The system memory 1206 can retain a number of program modules, such as an operating system, one or more application programs, other program modules, and program data. All or portions of an operating system, applications, modules, and/or data can be, for instance, cached in RAM, retained upon a hard disk drive, or any other suitable location. A user can enter commands and information into the computer 1202 through one or more wired/wireless input devices, such as a keyboard, pointing and clicking mechanism, pressure sensitive screen, microphone, joystick, stylus pen, etc. A monitor or other type of interface can also be connected to the system bus 1208.

The computer 1202 can operate in a networked environment using logical connections via wired and/or wireless communications to one or more remote computers, phones, or other computing devices, such as workstations, server computers, routers, personal computers, portable computers, microprocessor-based entertainment appliances, peer devices or other common network nodes, etc. The computer 902 can connect to other devices/networks by way of antenna, port, network interface adaptor, wireless access point, modem, and/or the like.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a memory to store computer-executable instructions; and
a processor, communicatively coupled to the memory, that facilitates execution of the computer-executable instructions to perform operations, comprising:
facilitating generation of an interface, between a device and services and applications for the device, wherein the interface includes a functionality to create the services and the applications;
managing an availability and a performance of the services and the applications across a service plane and a control plane, wherein the service plane includes a data path associated with the services and the applications and the control plane includes a service policy used to maintain the services and the applications;
providing solution responses in response to detection of any of network, service, and application problems;
invoking a business rule and an automated action to resolve a system problem, wherein the automated action includes a notification of service level agreement management billing of other systems that is tiered according to a business impact assessment and wherein the business impact assessment includes an analysis of a revenue impact of the system problem, a balanced assessment of a revenue impact and a cost impact of the system problem, a subscriber affected by the system problem, opinion data representing a public opinion of the system problem, a competitive advantage of the system problem and operational dependencies of the system problem including an inter-carrier dependency, and inter-service dependency, a regulatory mandate, and a criticality in time of disaster dependency; and
storing the network, service, and application problems, and the solution responses associated with the network, service, and application problems.

2. The system of claim 1, wherein the operations further comprise providing a service interaction with internal and external devices.

3. The system of claim 1, wherein the operations further comprise enabling creation of the services and the applications by a provider device external to the system.

4. The system of claim 1, wherein the operations further comprise monitoring availability and performance of the services and the applications across the service plane and the control plane.

5. The system of claim 4, wherein the operations further comprise using passive instrumentation and active instrumentation to monitor the availability and the performance.

6. The system of claim 5, wherein the passive instrumentation includes a use of standardized management information to monitor the availability and the performance.

7. The system of claim 5, wherein the passive instrumentation includes a use of usage information and enhanced data information to monitor the availability and the performance.

8. The system of claim 5, wherein the passive instrumentation includes a use of log information to monitor the availability and the performance.

9. The system of claim 5, wherein the passive instrumentation includes a use of pre-positioned passive probes to monitor the availability and the performance by measurement of a defined key process indicator.

10. The system of claim 5, wherein the active instrumentation includes a use of pre-positioned active probes to monitor the availability and the performance by measurement of a defined key process indicator.

11. The system of claim 10, wherein the pre-positioned active probes are activated in response to use of any of the services and the applications.

12. The system of claim 10, wherein the pre-positioned active probes are activated based on a configured system policy.

13. The system of claim 5, wherein the passive instrumentation and the active instrumentation generate an instruction to report and diagnose the network, service, and application problems and suggest respective resolutions for the network, service, and application problems.

14. The system of claim 13, wherein the operations further comprise correlating an outcome of the instruction with other outcomes of other instructions across time to provide a chronological pattern for a root cause analysis of the network, service, and application problems.

15. The system of claim 13, wherein the operations further comprise correlating an outcome of the instruction with other outcomes of other instructions across layers to provide a layer pattern to determine an association of a root cause with an individual layer.

16. The system of claim 13, wherein the operations further comprise correlating an outcome of the instruction with other outcomes of other instructions across domains to provide a domain pattern to determine an association of a root cause with an individual domain.

17. The system of claim 1, wherein the operations further comprise generating a graphical view of a network, a service, an application, and a device, allowing a view of a subset of the network, services, applications, and devices associated with the system problem.

18. The system of claim 17, wherein the graphical view enables a drill down operation with a view of a service, application, and device that displays diagnostic information about the service, application, and device.

19. The system of claim 17, wherein the graphical view includes a view of customer performance for account management and customer service.

20. The system of claim 17, wherein the graphical view includes a service and an application provided by a third party device.

21. The system of claim 17, wherein the graphical view includes end-to-end service and application life cycle management and testing.

22. The system of claim 1, wherein the automated action further includes an invocation of an automated test to isolate the system problem.

23. The system of claim 1, wherein the automated action further includes an invocation of a control to resolve the system problem.

24. The system of claim 1, wherein the automated action further includes a communication of a condition of a first system to other systems for invocation of a policy-based control for problem resolution.

25. The system of claim 1, wherein the automated action further includes a generation of maintenance ticket data representative of a maintenance ticket that requests an additional resolution and a transmission of the maintenance ticket to a device identified as responsible for the additional resolution.

26. The system of claim 1, wherein the automated action further includes a notification of other systems' credit, and capacity information.

27. The system of claim 1, wherein the operations further comprise shifting application resource usage between a server and a client device based on activity of the client device.

28. The system of claim 1, wherein the operations further comprise shifting application resource usage between a server and a client device based on predefined optimization.

29. A non-transitory computer readable storage medium having computer-readable instructions that, in response to execution, cause a system including a processor to perform operations, comprising:
  interfacing to a device with services and applications;
  facilitating instantiation of the services and the applications;
  managing an availability and a performance of a service and an application of the services and the applications;
  billing for use of the service and the application;
  resolving a problem for any of a network, the service, the application, and a device as a function of a control plane and a service plane, wherein the control plane includes a service policy for any of the network, the service, the application, and the device and the service plane includes a path traversed by data associated with the services and the applications in conformity with the service policy;
  invoking a business rule and an automated action to resolve a system problem, wherein the automated action includes a notification of service level agreement management billing of other systems that is tiered according to a business impact assessment and wherein the business impact assessment includes an analysis of a revenue impact of the system problem, a balanced assessment of the revenue impact and a cost impact of the system problem, a subscriber affected by the system problem, opinion data representing a public opinion of the system problem, a competitive advantage of the system problem and operational dependencies of the system problem including an inter-carrier dependency, and inter-service dependency, a regulatory mandate, and a criticality in time of disaster dependency; and
  storing system data and reports relating to usage of the services and the applications.

30. The non-transitory computer readable storage medium of claim 29, the operations further comprising:
  displaying a view of a service assurance system.

31. The non-transitory computer readable storage medium of claim 29, the operations further comprising:
  providing access security and system visibility based on a login credential.

32. The non-transitory computer readable storage medium of claim 29, the operations further comprising:
  allocating system resources based on a current condition of the system.

33. A method, comprising:
  facilitating generation of an interface, by a system including a processor, to services and applications usable by a device;
  facilitating, by the system, instantiation of the services and applications;
  determining, by the system, a service and application availability and performance including determining the service and application availability and performance based on a control of routes, a capacity, a reservation, and a service policy, and a path traversed by data associated with the services and applications in conformance with the control of routes, the capacity, the reservation and the service policy;
  detecting, by the system, a problem and providing a solution response to any of a network, a service of the services, an application of the applications, and a device;
  invoking, by the system, a business rule and an automated action to resolve a system problem, wherein the automated action includes a notification of service level agreement management billing of other systems that is tiered according to a business impact assessment and wherein the business impact assessment includes an analysis of a revenue impact of the system problem, a balanced assessment of a revenue impact and a cost impact of the system problem, a subscriber affected by the system problem, opinion data representing a public opinion of the system problem, a competitive advantage of the system problem and operational dependencies of the system problem including an inter-carrier dependency, and inter-service dependency, a regulatory mandate, and a criticality in time of disaster dependency; and
  storing, by the system, data and audit information collected from monitoring the network, the problem, and the solution response.

* * * * *